Oct. 15, 1957   M. M. SAVAGE   2,809,525
SELF-ORIENTING IMMERSION INSTRUMENTS
Filed July 18, 1951   3 Sheets-Sheet 1
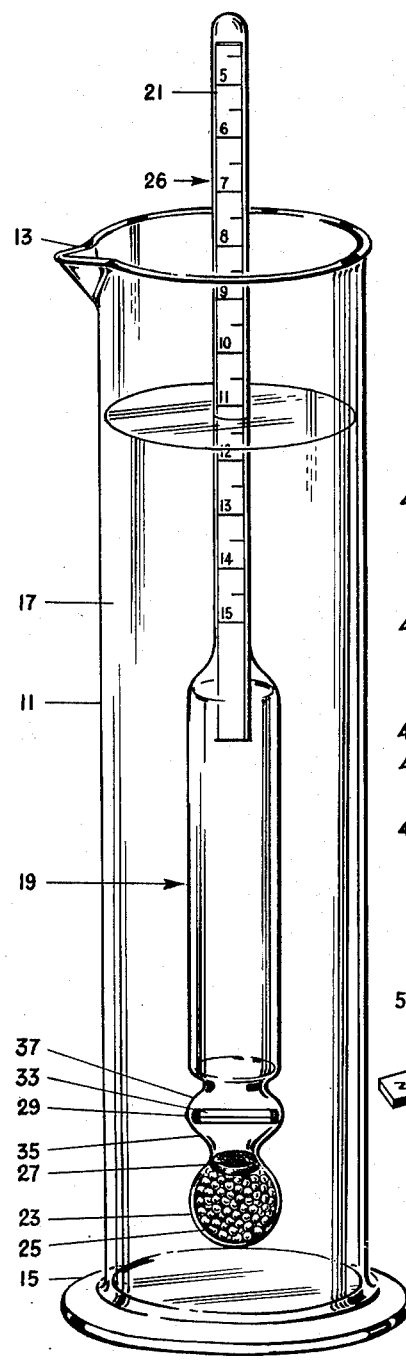
Fig. 1
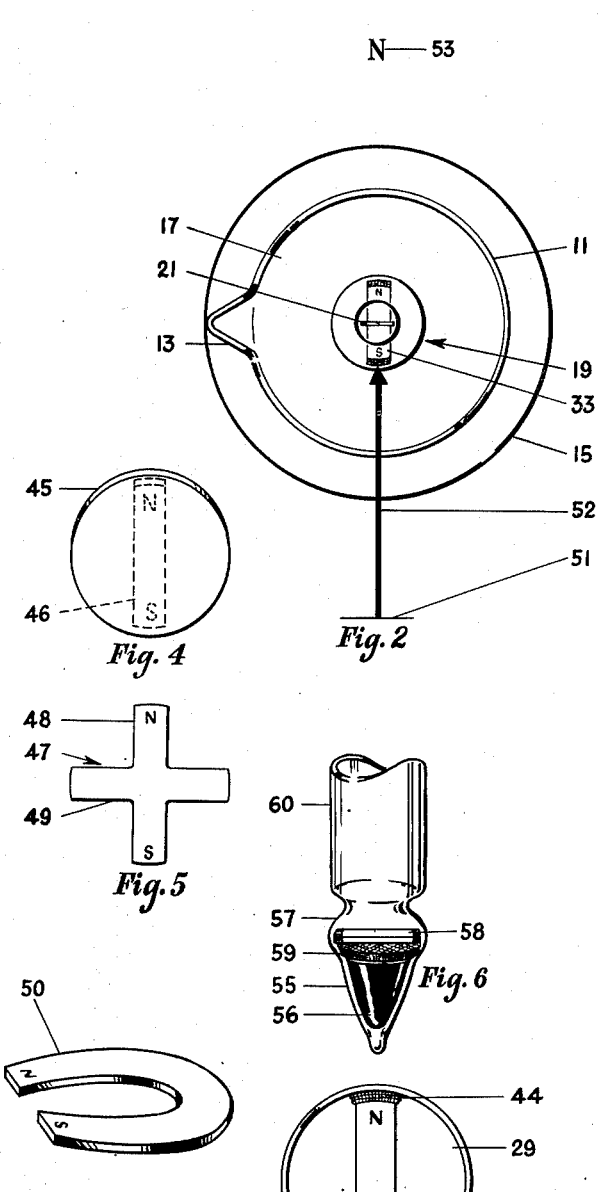
Fig. 2
Fig. 3
Fig. 4
Fig. 5
Fig. 6
INVENTOR.
Merle Morris Savage
BY INVENTOR.
Merle Morris Savage Oct. 15, 1957　　　M. M. SAVAGE　　　2,809,525
SELF-ORIENTING IMMERSION INSTRUMENTS
Filed July 18, 1951　　　　　　　　　　　　3 Sheets-Sheet 3

INVENTOR.
Merle Morris Savage
BY
Attorney

United States Patent Office 2,809,525
Patented Oct. 15, 1957

2,809,525

SELF-ORIENTING IMMERSION INSTRUMENTS

Merle Morris Savage, Apopka, Fla.

Application July 18, 1951, Serial No. 237,441

27 Claims. (Cl. 73—449)

In many industrial and scientific enterprises it is necessary for workers to read scales upon various types of measuring instruments which are immersed in liquids, either floating or suspended. In many such establishments and laboratories it is necessary that a worker make such readings frequently. Immersion instruments as at present supplied float or swing to any position in a horizontal plane so that their scales may not easily be read from any fixed position or from one which is convenient for a worker. For example, an ordinary hydrometer is free to swing in a circle of 360 degrees after it has been placed in a liquid. Only by chance does it reach equilibrium with its scale facing an operator. In the citrus industry, for one example only, soluble solids of citrus juice are frequently checked with hydrometers by food inspectors, picking foremen and control laboratory operators. To do so they lean over their working spaces first to one side and then to the other in efforts to locate and read elusive scales bodily rotating on vertical axes. Obviously such an instrument cannot be rotated by hand to a convenient position while it is immersed in a liquid because thereafter time would be lost in waiting for the instrument to return to equilibrium and further rotation is almost certain when the fingers are removed from the instrument.

Also photographic technicians using thermometers, often in dark rooms, have the same difficulty, as do workers who make scientific determinations as diverse as those, for a few further and random examples only, in medical and other scientific laboratories of all descriptions, the petroleum industry, heavy chemical industries, such as for the manufacture of sulphuric acid or fertilizers, tanneries, breweries, distilleries, meat packing, dairying and other food processing plants.

Similar difficulties apply even to hand instruments of the syringe type wherein liquid is drawn up into an outer container wherein an inner device with a scale freely floats. Bodily rotation of the instruments as a whole does not necessarily move the inner scale to, or maintain it in, a desired position.

My invention overcomes these difficulties. I provide means by which an immersion instrument is so pre-set that it is always self-orienting as desired. That is to say a worker using the apparatus of my invention may successively read a scale from any chosen position, the scale always assuming the same position on its vertical axis. Thus an instrument constructed and operated according to my invention may be set so that the scale is always in a viewing plane most convenient for a worker. I apply my invention to thermometers, hydrometers, hydrometers and thermometers in combination, urinometers, Baume, Twaddle or Brix hydrometers of any type, alcoholometers, salinometers, lactometers, saccharometers and in fact any instrument having a scale which is immersed in a liquid, whether by suspension or flotation.

In instruments made and used according to this invention the scale after the instrument is placed within a liquid always is disposed in a predetermined relative position opposite what for convenience I call a viewing station. According to preferred forms of this invention such position and hence station may be changed at will. Alternatively the orientation is set when an instrument is manufactured and cannot be thereafter changed. Thus with either type a worker at his viewing station can readily and quickly read the scale without movement of the head or body and without loss of time.

To accomplish this result I pre-position a magnetic instrumentality, such, for one example only, as a magnet bar, within an immersion instrument so that the attraction of the magnetic north causes the magnetic device to rotate the entire instrument in a plane normal to its vertical axis as it floats or is freely suspended in order to bring the scale in line with a desired viewing station and to hold it there. As a first step the position of the north (in the northern hemisphere) pole of the magnet as it points to the magnetic pole is determined in relation to a chosen viewing station and the magnet so set within the instrument that when the instrument is free to move in a vertical plane in a liquid the scale is thereupon necessarily disposed opposite and visible from the viewing station.

The mounting of a magnet within the instrument preferably is such that a user may readily and at will change its relative position in this plane and hence the location of the scale. As a practical matter the pre-setting of the magnet may easily be carried out by trial and error as well as by calculation. The necessary rotation of the magnet bar within the instrument is accomplished by the use of a more powerful magnet or a bar or other mass of iron or by various simple and effective methods later described and claimed. This magnetic device, in certain of the embodiments of this invention, in addition to accomplishing the orienting result of my invention also assists in keeping the instrument vertical in the liquid.

In one form of my invention a bar magnet is merely disposed in position as in the base of an instrument with sufficient frictional resistance between certain of its surfaces and adjacent surfaces of the interior of a chamber of the instrument that as the attraction of the magnetic pole is exerted the magnet swings the entire instrument to the pre-set position but with sufficient slippage possible between the surfaces of the magnet and those of the body of the instrument to be overcome by the power of a magnet of greater force held nearby or by gravity so that the relative direction of placement of the scale may be changed at will. If a bar magnet is used as above I prefer to place a resilient facing such as a small pad of felt or sponge rubber between it and an adjacent wall of the instrument. Alternatively I may place an orienting magnet in a desired position in a simple locking device wherein the magnet is positioned by gravity and held by simple detents, as a series of notches or depressions in which a magnet bar fits. When it is desired to change the orientation the instrument is turned upside down or upon its side and the more powerful magnet is applied to move the orienting bar to the new position. Alternatively such a magnet may be pivoted, as upon an inner stem or tube (e. g., a thermometer stem) of a testing instrument or an independent pivot, and preferably made heavier at one end than at the other; then when the instrument is turned on its side it swings to the desired relative position and when the instrument is righted falls into and remains in place. In an alternative form of this invention I mount a bar magnet in a disc of fibre or other dielectric material, contact between the outside of the disc and the inside surface of the glass acting to transmit force. In a variant of this form I may employ a magnetizable plastic disc, so magnetized as to dispose the poles in proper position. In all forms of my invention in which a positive lock is not used, the force-transmitting means between the magnet and the instrument is sufficient to rotate the instrument under the influence of the magnet as it seeks north but insufficient to prevent re-setting. In other embodiments wherein a user does not change the orientation at will my magnetic instrumentality is sealed in place at the factory.

The objects of my inventions include the provision of a self-orienting immersion instrument which is pre-set permanently or subject to change as desired, so that its scale when in use will be disposed and maintained opposite a selected viewing station, that is, in any predetermined position most convenient for a worker. Other objects, characteristics and advantages of my invention will be clear from the above generalized and the following detailed portion of this specification, the attached drawings, and the subjoined claims. While for purposes of illustration I am showing preferred forms only of my invention, it will be readily understood that changes may be made therein without departing from the spirit of my invention or the scope of my broader claims.

In the drawings:

Figure 1 is a perspective view showing one of my self-orienting immersion instruments, in this illustration a hydrometer, in position in a jar, together with a magnet of a type which may be employed to pre-set my instrument and practice my method.

Figure 2 is a top plan view of the subject matter of Figure 1; the relative position of certain parts having been changed for convenience in presentation and certain parts being omitted for clarity and a viewing station having been indicated.

Figure 3 is a fragmentary showing in top plan of a magnetic actuating instrumentality which may be employed in Figures 1 wherein a resilient pad or facing is employed between the ends of a magnet bar and adjacent surfaces of an orientation chamber.

Figure 4 is a fragmentary perspective showing of an orienting disc of dielectric material having a bar magnet therein.

Figure 5 is a top plane view of a cruciform orienting instrumentality constructed of magnetizable plastic material.

Figure 6 is a fragmentary view which in perspective shows a variant of Figure 1.

Figure 9:
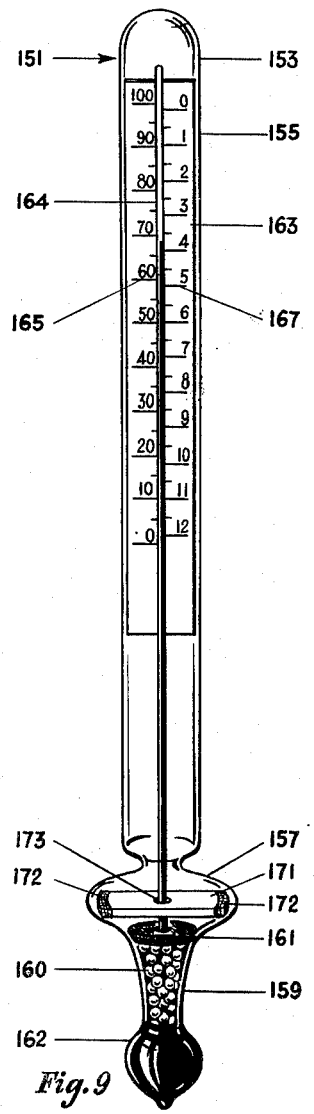

Figure 9 (Sheet three) in perspective shows a different type of combined thermometer and hydrometer.

Figure 10:
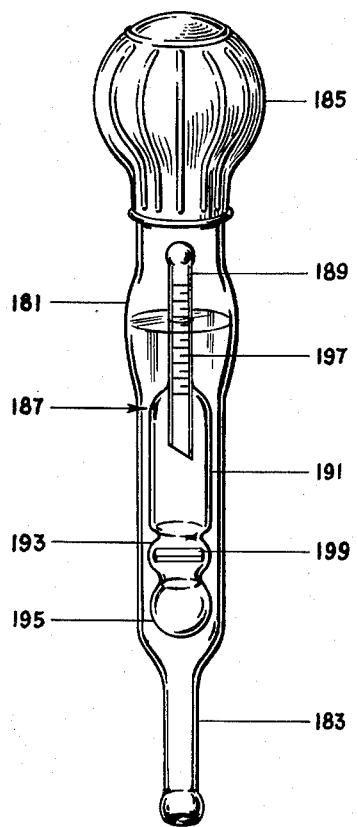

Figure 10 illustrates my invention applied to a syringe type instrument such as a urinometer.

Figure 11:
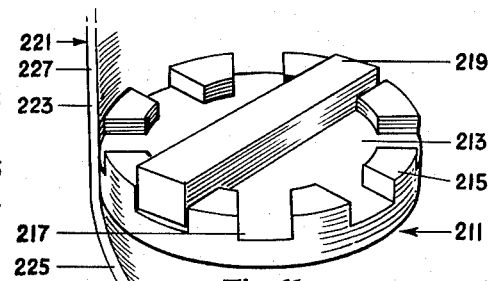

Figure 11 is an enlarged perspective fragmentary view of a preferred form of orienting and locking mechanism applicable to various types of my instruments.

Figure 12:
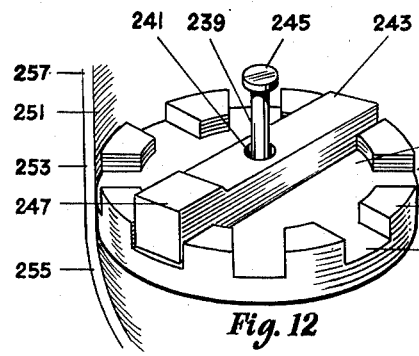

Figure 12 in fragmentary and perspective form shows another preferred embodiment wherein I combine a special pivot, an orienting magnet bar which is heavier at one end than the other and locking and supporting plate cooperating therewith.

In the following description and in the sub-joined claims the orientation is that of one of my instruments in use, as for example a hydrometer in a hydrometer jar. Therefore, "upper," "upwardly," "top" and similar terms mean the portion of the instrument or jar in a direction above a table or other surface upon which a vessel is supported, that vessel containing a liquid in which an instrument is immersed. "Lower" and "bottom" and like terms mean the opposite direction or side. "Vertical," "horizontal" and similar terms are applied from the point of view of an instrument so employed. I am aware of course of the deviation between true north and magnetic north but for simplicity I may disregard this distinction and speak of "north" as meaning the magnetic north. Also although my invention can be practiced as well south as north of the equator, the terminology herein is from the standpoint of the northern hemisphere, it being understood that I also include the southern, the south pole then being understood as alternative to the north. For convenience I use the term "polar axis" as meaning a line joining the north and south poles of my magnetic operating device. For simplicity in the subjoined claims I employ the term "magnet," except when otherwise limited, to include a bar magnet and any of the other magnetic devices herein described and those equivalent thereto. I use the term "viewing station," represented in Figure 2 by a straight line parallel to a scale of an instrument, to indicate a position which a worker chooses from which to view my instrument and "optical axis of a viewing station" to indicate the approximate line of vision of the viewer, such line necessarily being normal to the plane of the scale.

Applicant uses the words "mount," "mountings" and "to mount" in their ordinary dictionary meanings, as in a verbal sense to "equip or prepare for use" or "to put or fasten upon anything that sustains and fits for use," or "to fix in position for the accomplishment of a particular purpose," and in their nounal sense that by which the foregoing verbal concept is carried out. Likewise applicant uses the word "pre-set" in its ordinary dictionary meaning as a combination of the concepts "to set;" meaning "to fix in a situation or direction" or "to make to assume a specified sphere, condition, occupation, relation, etc. . . . "to put;" and "pre" adding the denotation of setting in position in relation to something else which follows in time, place, circumstance or thought. Thus when applicant speaks of pre-setting his magnetic device he means, as is obvious from standard English dictionaries, to position that device in relation to the particular viewing station with which the device is to be used. Whether this pre-setting is done in a factory or in the field it must be in pre-determined relation to the particular viewing station with which the instrument is to be used so that upon free rotation when the instrument comes to rest its calibrations will be visible from that viewing station.

As shown in Figure 1 a hydrometer jar 11 having a pouring lip 13 and a base 15 carries a liquid 17 in which is disposed an immersion instrument generally indicated as 19 with a scale 21. For purposes of illustration this instrument is shown in this figure as a hydrometer but it may be of any type suitable for immersion in a liquid and having a scale which must be read visually. This hydrometer includes a lower bulb 23 shown as filled with weights such as shot 25 which are held in place by a wadding of cotton or the like 27. Above this bulb is another bulbular extension 29, called an orientation or operating chamber, from the body of the instrument 19. My orienting bar magnet 33 is disposed in this chamber. It is supported by a lower shoulder 35 of bulb 29, between it and an upper shoulder 37. A small space intervenes between the top of the bar and the upper shoulder.

The ends of the bar magnet may carry small resilient pads or facings as of felt or sponge rubber. Alternatively they may be bare. In the latter case they slightly clear the interior and substantially vertical surface of the orienting chamber 29. Owing to the differences of coefficients of expansion between the glass and the metal of which the bars are made there is danger of breakage when the two are in actual contact. The interposition of the felt is sufficient to accommodate this slight expansion and contraction as well as to provide a desirable frictional bearing. Their weight is sufficient to cause the entire instrument to rotate under the magnetic influence.

Under ordinary conditions when a bar magnet is used without a special mount of types later described and illustrated in Figures 11 and 12, however, I prefer the construction shown in Figure 3 because this frictional bearing avoids the possibility of unwanted slippage when the instrument is handled. From the definitions previously given as well as the common dictionary meanings of "mount" and "to mount" it will be understood that the mount of the bar magnet of such figures as 1, 2, 3, 7, 8 and 9 comprise the resilient facings (such as 44) of the bar magnets and the lower shoulder (such as 35) or the disc of Figure 4; in the form of Figure 7 (right) the tube 121 and the wadding 129 and in Figure 9 the tube 164 are also included as a part of the mounting, all of these parts being described in due course hereinafter. In that case an orienting chamber 29, as just described, has disposed within it a magnet bar 40, corresponding to bar 33, with resilient pads or facings 44 as of felt affixed to each of its ends. The frictional resistance between the pads and the interior surface is sufficient so that the magnet swings the entire instrument to orient it but insufficient to prevent relative movement between the bar and the remainder of the instrument when a more powerful magnet is applied to re-set it. It will thus be seen that in this embodiment of my invention the inner surface of the wall of the instrument and the facings upon the bar magnet, or the ends of the bar magnet if used without the pads, cooperate to form mounting means.

Figures 4 and 5 illustrate other types of orienting or operating instrumentalities.

The magnetic device of Figure 4 consists of a plastic or fibre disc 45 of dielectric material into which a magnet bar 46 is inserted. As shown, it is within the disc, and may be so cast with the plastic, but it has been found satisfactory to set it into an opening cut in the disc.

As shown in Figure 5 a cruciform member 47 is made of such, for one example only, as that known as "Hardyne," magnetizable plastic, with arms 48, vertical as viewed in the drawings, magnetized to provide north and south poles, and arms 49, horizontal as so viewed, to bear against the inner surface of the orientation chamber thereby furnishing a firm mounting. The ends of these members are slightly curved to correspond to the contour of the inner surfaces of the chamber in which they are used. Instead of the four-armed structure illustrated above, any desired and practicable form may be utilized. An advantage of the shape shown is that it saves weight and material but is rigid and the four-point bearing gives excellent contact with the inner surface of the chamber. A three-armed or other multi-armed member may be substituted.

In the preferred forms of either Figures 4 or 5 the fibre or plastic bears directly against the inner surface of the orientation chamber, with no danger of breakage following contraction or expansion. This contact furnishes sufficient force-transmitting contact so that the magnetism of the device may orient the instrument and sufficient slippage so that it can be re-set.

Figure 6 shows a variant of my invention wherein a lower bulb 55 filled as with lead 56 is disposed below an orienting bulb 57. A bar magnet 58 is supported upon the lead with felt or other similar facing pads 59 bearing upon the inner surfaces of the orienting chamber. A flotation chamber 60 extends upwardly. Otherwise the construction of the instrument may be as previously described.

As previously stated, my instruments may be pre-set at the factory but I prefer the types just described which are adjustable at will by a user. If the setting is at the factory any practicable method of sealing the operating instrumentality into position may be employed. The most simple, except where a bar-magnet bar is used, is to enlarge the dimensions of the bar and pad, or of the plastic disc or multi-armed structure so that the fit between its periphery and the inner surface of the chamber is tight. In addition or alternatively an adhesive may be employed.

In order to orient or re-orient or pre-set my adjustable instruments a magnet 50 as illustrated in Figure 1 may be used. Alternatively an iron, bar or a convenient radiator or water pipe, may be employed. It will be readily understood that the force of the magnet (or the attraction of a mass of iron) is sufficient to draw the orienting magnet-bar 33 or the north pole of bar 46 or of leg 48 to whatever position is necessary in order to place the scale opposite any desired viewing station, indicated as 51 in Figure 2, when the instrument is freely suspended. The optical or viewing axis 52 of this station represents a straight-forward line of sight of an observer. In Figure 2 it is assumed that the scale is to be read from the south. The bar magnet 33 is shown as pointing to the north indicated as N 53. Thus to pre-set the instrument for the conditions of Figure 2 the north pole of the magnet bar 33 or the variants shown by means of magnet 50 must be rotated to a point 180 degrees from the viewing station. In Figure 1 if it is assumed that the left-ward end of the bar magnet represents its north pole the scale is to be read from the west and the polar axis is parallel to the viewing station. To change the setting so that the scale can be read from the south, as in Figure 2, relative rotation of ninety degrees between the plane of the scale and the polar axis would be required, the movement of the scale being counter clockwise (if the magnet is held fixed and the instrument revolved relatively thereto as later described). It will be seen that the plane of the scale always must be parallel (or substantially so) to the plane of the viewing station and the viewing axis must be perpendicular to the plane of the scale, the optical axis being horizontal and the plane of the scale being vertical. Therefore my method includes the positioning of an immersion instrument in a vertical plane so that it is free to rotate upon a vertical axis and pre-setting a magnet so that magnetic attraction will cause it to rotate the instrument until the planes of the scale and of the viewing station are parallel or the viewing axis is normal to the plane of the scale. In other words relative rotation between the north pole of the bar magnet and the scale is through the number of degrees necessary to bring the scale parallel to the viewing station and direction of station is in such direction as to make the calibrations visible therefrom.

Wherever the instrument is used there are two fixed conditions, namely, magnetic north and the viewing station. Since the north pole of the orienting magnet seeks north it becomes apparent that the angle of north pole of the orienting magnet to the viewing station is equal to the angle of magnetic north to the viewing station. The required relative adjustment then is between the scale and the viewing station. If the angle generated by bringing the scale parallel to the viewing station is positive then the angle of adjustment to be applied to the magnet will be negative, and vice versa, according to mathematical law.

The actual setting operation may be carried out as follows: An operator at the viewing station places the instrument in a suitable liquid as in a hydrometer jar or otherwise suspends it. The north pole of the magnet turns to magnetic north swinging the instrument with it. Holding the instrument in this position the operator applies a piece of iron or the south pole of an adjusting magnet to the outside of the jar or adjacent the instrument if it is suspended in air and at a point near the north pole of the orienting bar magnet, thus holding the orienting magnet in the north-south plane. The operator then turns the instrument until the scale faces the viewing station. The instrument is now oriented.

In the foregoing portion of this description I have illustrated my invention as applied to a hydrometer. It will be readily understood, however, that it may be employed equally well with any other instrument which has a scale which has to be read visually and is to be suspended or floated in a liquid.

In the foregoing and following descriptions I am presenting my invention with the orienting instrumentalities permanently disposed within an enclosure of the instrument. While I prefer this arrangement it is entirely practicable and within the ambit of my invention for the magnet to be attached to the exterior of the instrument, as, for example, by a clamp or the like. If the instrument is of a type of hydrometer suitable allowance must of course be made for the added weight but with other instruments such as a thermometer no such adjustment is necessary. Also I am describing my invention with the bar magnet as adjustable. For certain purposes, however, and as previously stated I may embody my invention in an instrument wherein the magnet is permanently set at the factory. In devices so designed it is of course necessary for a purchaser to state in advance what orientation he prefers.

Figures 7, 8:
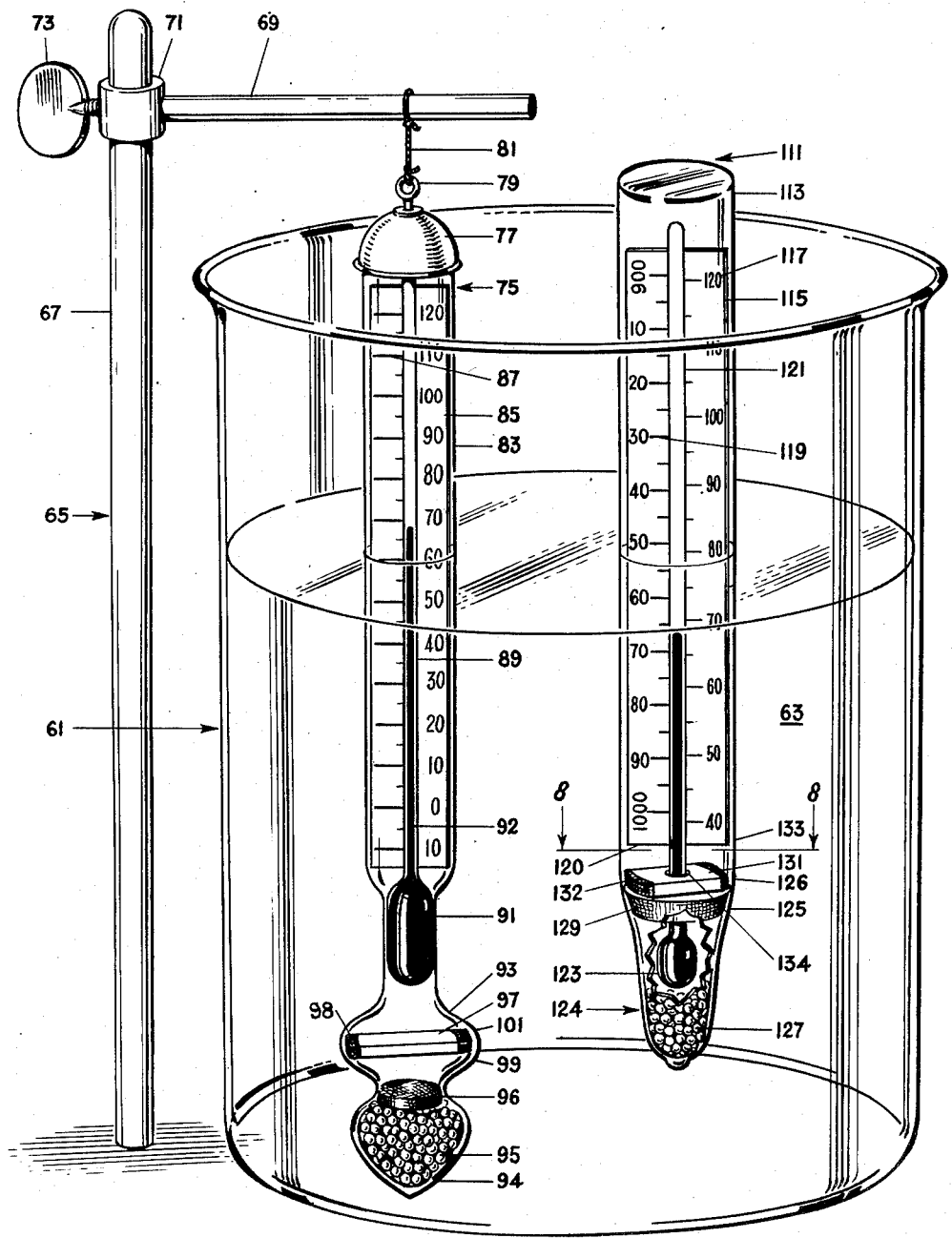
Figure 7 (Sheet two) is a perspective showing of two of my instruments, a thermometer which is suspended and a combined thermometer and hydrometer which is floating, both in the same liquid.
Figure 8 is a fragmentary top plan view of a portion of the "Hydrometer-Thermometer" in Figure 7 taken on the line 8—8 thereof.

For convenience in presentation in Figure 7 I show a thermometer embodying my invention suspended in the same jar in which a combined thermometer and hydrometer likewise making use of my orienting device freely floats.

A laboratory jar 61 contains a liquid 63. A support generally indicated as 65 includes a vertical bar 67 and a horizontal or cross bar 69 attached thereto by a collar 71 and thumb nut 73 so that the height of the cross bar above the liquid may be adjusted at will. A thermometer generally indicated as 75 having a metallic cap 77 with an eye 79 is attached as by a cord 81 to the cross bar thus suspending the thermometer in the liquid. The thermometer consists essentially of an outer or enclosing tube 83 having a scale 85 with calibrations 87 and a mercury tube 89 the lower end of which terminates in a bulb 91 in which is based a column of mercury 92. Below the mercury bulb is an orientation chamber 93 and therebelow a weight chamber 94 filled with shot 95 held in place as by wadding 96. An orientation or operating magnet bar 97 carries at each end a strip of or facing of felt 98 or other similar material, for the purposes already described. For clarity in this and other figures, the width of this facing is exaggerated somewhat. As will be seen from Figure 7 the magnet rests upon an inner surface of a receding portion or shoulder 99 of the orientation chamber. As indicated at 101 this wall as it narrows above the bar forms shoulders which clear the felt facing of the upper portion of the magnet bar. There is sufficient frictional contact between the facing and the inner surface of the chamber so that the attraction of the north pole of the magnet by magnetic north will be sufficient so that movement will be communicated to the thermometer by the magnet.

The setting of this form of my device is the same as that previously described.

Likewise in Figure 7 to the right thereof I show a combined instrument generally indicated at 111 embodying a hydrometer, a thermometer and my orienting device. This combination instrument is particularly valuable because, as is well known to those skilled in this art, the scale of a hydrometer is designed to read specific gravity of a particular liquid at a given temperature. Since specific gravity is affected by changes in temperature it is necessary to apply a temperature correction when operating in fluids at temperatures other than that for which the instrument was calibrated. The temperature scale of many hydrometers with a built in thermometer gives the correction to be applied and not the temperature of the liquid. In many instruments the temperature and the correction are both shown and in others merely the temperature.

In this embodiment of my invention, an outer tube 113 encloses a scale 115 which includes both temperature calibrations 117 and calibrations 119 relating to specific gravity. The bottom edge 120 of the scale is useful as later described. A tube 121 for the mercury of the thermometer terminates downwardly in a bulb 123 which is disposed in a central portion of a combined weighting and orientation chamber 124. The sides of this chamber at 125 form shoulders and widen out thereabove at 126, for reasons which are later apparent. Shot 127 surrounding the bulb gives additional weight to hold the instrument upright. Wadding or other similar material 129 upon the top of the shot holds it in place. A bar magnet 131 having felt or other resilient facings 132 bearing against the inner surface of the wall of the chamber is disposed above this wadding. It will be particularly noted as illustrated in Figure 8 that this bar magnet is formed with a central opening 134 by means of which it is mounted for rotation upon mercury tube 121.

The method of setting this form of my device is somewhat different from that previously explained. The facings 132 of the bar 131 bear lightly against the interior surface of shoulders 125 of tube 113 with sufficient force to communicate the rotational force of the magnet to the instrument to orient it but with insufficient force to prevent bodily vertical movement when the instrument is inverted. When the instrument is so turned the bar 131 falls downwardly and rests against the bottom surface 120 of the scale, which limits the movement of the bar along the axis of tube 121. This movement is possible because the orientation chamber widens out slightly above shoulders 125. When the magnet is in this position it will be free to be rotated since the facing of the magnet bar will be free of contact with the shoulder. Thus when the instrument is turned upside down the bar will very readily move by gravity to a free position and then may be rotated by a magnet or bar of iron. Alternatively in this form of my invention it is possible for gravity to rotate the bar upon this tube as a pivot with the instrument held at an angle of about ninety degrees, the bar first having been freed by the inversion of the instrument. If as is described in connection with Figure 12 I make one end of this bar slightly heavier than the other it may be caused easily to turn to a desired position merely by bodily rotating the instrument itself while it is held substantially horizontally, the extra weight on one end of the bar of course forcing the bar as a whole to rotate until it establishes a then perpendicular position.

Figure 9 (Sheet Three) shows a variant of the combined hydrometer and thermometer shown in the right hand portion of Figure 7. An instrument generally indicated as 151 includes an enclosing tube 153 having a scale and flotation chamber 155, an orientation chamber 157, a weighting chamber 159 enclosing shot 160 held in place by wadding 161, and a mercury bulb 162. An indicia-carrying sheet 163 associated with mercury tube 164 bears temperature calibrations 165 and calibrations 167 which indicate specific gravity. A bar magnet 171 with facing pads 172 by a central opening 173 is pivoted for rotation upon the mercury tube. As in the form of my invention which I show in Figures 3 and 7 the resilient facings of this bar bear against the inner surface of the orientation chamber to furnish sufficient resistance to cause the bar to rotate the instrument as desired by insufficient resistance to prevent setting in the manner previously described.

As is shown in Figure 10 my invention may be applied to a hydrometer of the so-called syringe type wherein an outer bulb-operated container encloses an immersion instrument, such as an urinometer. Similar instruments are familiar in automobile service stations for checking the state of charge or discharge of cells by determining the specific gravity of their liquid contents and to check concentration of anti-freeze solutions. An outer tube 181 has an intake extension 183 and is equipped with a bulb 185. Within this outer structure an instrument or testing device generally indicated as 187 is disposed, this instrument consisting of a scale chamber 189, flotation chamber 191, orientation chamber 193 and weighting chamber 195, enclosing a suitable weight not shown. A scale 197 having calibrations not shown is disposed within the scale chamber. A magnet bar 199 preferably with resilient facings not shown is disposed in this orientation chamber and operates in the manner previously described. Weights not shown hold the inner instrument in the desired vertical position. A technician who uses the instrument after he has collapsed bulb 185 places the in-take in a vessel containing a sample of the liquid to be tested, draws it up within the tube and quickly makes the desired reading, since he does not need constantly to change his position to read the scale.

Since such an instrument is held in the hand and may be bodily rotated at will to assume any position upon a vertical axis it may be asked why there is need for an orienting device for the inner instrument. As technicians know, often to their annoyance, an inner instrument with a scale immersed in a liquid in a container is very likely to rotate so that it is difficult to read. Bodily rotation of the outer container does not necessarily rotate the inner instrument, at least to the position desired. If for example the outer container 181 is bodily rotated opposite a desired viewing position convenient for the reading of the scale 197 the worker may then find that the inner instrument has remained in its previous position or has rotated to another position. The retention of the scale in a given position while it is being read is of importance comparable to that of its original positioning.

Figures 11 and 12 show a combined supporting and locking disc for a magnet bar. Discs of these types may be utilized with any of the previously described forms of this invention, preferably, however, with changes in the configuration of the orienting chamber as shown herein.

As is shown in Figure 11 a disc made of non-magnetic material generally indicated as 211 is formed with a central supporting surface 213 and a series of protuberances 215 between which paired and opposite locking notches 217 are formed. A magnet bar 219 is so disposed that it fits readily within pairs of these notches. Also when this locking and positioning disc is used with an instrument having a central tube, openings for the tube are formed in disc and bar, and the tube acts as a pivot, in the manner of the special pivot shown in Figure 12.

This disc is disposed within an orientation chamber 221, shown only in part, having walls 223 which define a contracted lower portion having shoulders 225 upon which this multi-purposed disc rests. The walls rise vertically, as indicated at 227, for a distance sufficient to permit the bar 219 to clear the protuberances when it is re-set. In order to hold the disc firmly in place, when the container is blown the walls of the shoulder are brought close against the outer edges of the disc and an adhesive may also be applied. The only modification necessary for use of this lock in embodiments of my invention previously described is to make the ascending portions of the walls 223 vertical, as is shown in the rightward instrument of Figure 7, so that the magnet bar may clear the walls during a re-setting operation.

To re-set an instrument including this locking and positioning instrumentality a user turns it end for end, thus permitting the bar to fall out of the locking notches. After he has rotated the bar to the position which represents the desired setting he rights the instrument and the bar falls into the nearest available pair of opposite notches, wherein it is held. Adjustment can also be made by lifting the bar magnet out of the notches with the adjusting magnet and turning it to desired location. Clearance between the ends of the bar 219 and the side walls is so slight that the bar is held to bodily vertical and rotational movements only. Although I am showing only four locking positions it will be understood that as many as are desired or practicable may be provided.

Figure 12 resembles Figure 11 but embodies a central pivot attached to a supporting plate and illustrates construction of the magnet bar with one end heavier than the other.

A combined supporting and positioning plate or disc generally indicated as 231 has a supporting surface 233 and a series of protuberances 235 forming notches 237 therebetween, as previously described. A central pivot pin 239 passes through an opening 241 in magnet bar 243 and is formed with a head 245. As will clearly be seen from Figure 12 one end of this magnet bar has an enlargement 247 which increases its weight. An orientation chamber 251, of which a fragment only is shown, has walls 253 formed with shoulders 255 and a upper vertical section 257 as previously described.

This supporting and locking plate may be used in any one of the forms of my invention except those wherein I employ a tube as of a thermometer as a pivot pin in place of pin 239. The extra weighting of the magnet bar may be applied to any form of the invention wherein the magnet bar is pivoted, as for example that of Figure 9 and that shown to the right in Figure 7. The disc is held in place by contact with wall 257. The walls rise vertically for a distance sufficient to permit the bar to be freed from notches and to provide room for the bodily movement of the bar free of the notches prior to its rotation to a new position.

To set the magnet bar according to this exemplification of my invention a user merely turns the instrument upon its side and twirls it slowly until gravity pulls the weighted end 247 of the magnet bar to the desired position opposite the detent notches which are so disposed as to hold the bar in the wanted position. He thereupon rights the instrument and the bar falls into the desired pair of notches.

The advantages of my invention will have been apparent from the foregoing portion of this specification. They include the provision means whereby in an immersion testing instrument with a visible scale the scale is always disposed and held in a predetermined position convenient for a technician who is carrying out a test, together with means for pre-setting such a device.

I claim:

1. In a testing instrument adapted for immersion in successive samples of liquids to be tested and free rotation therein upon a vertical axis and to be read from a pre-selected viewing station; said instrument including means for maintaining it vertical in said liquid and a visible scale rigidly mounted upon said instrument: a magnetic orienting device bodily movable in a horizontal plane in relation to said instrument and bodily movable therewith, and pre-settable mounting instrumentalities connecting said device and said instrument by which said instrument is prepared for its intended use by the angular movement of said magnetic device in relation to said instrument to a position in relation to said viewing station selected so that said scale when said instrument is free to move in said liquid under the influence of a magnetic pole of the earth said instrument is bodily moved by said magnetic device to a position in line with said viewing station and held thereat against rotation in a horizontal plane so that said scale can be easily read by an observer at said station, said instrumentalities being fixed to said magnetic device and after such pre-setting engaging said instrument with sufficient force to overcome its inertia when so immersed.

2. In a testing instrument adapted for immersion in successive samples of liquid and free rotation upon a vertical axis therein and adapted to be read from a pre-selected fixed viewing station; said instrument having a scale rigidly mounted upon said instrument for rotation therewith and having visible calibrations upon said scale: a pre-settable magnet mounted upon said instrument and bodily movable in relation to said instrument into a position thereupon predetermined in relation to said viewing station, connective instrumentalities embodied in said instrument and said magnet for communicating to said instrument movement of said magnet under the influence of a magnetic pole of the earth, the magnetic force of said magnet acting through said instrumentalities being greater than the inertia of said instrument after said instrument has been placed in said liquid for said free rotation therein, said predetermined position bearing such relation to the plane of said visible calibrations that when said instrument has been so placed in said liquid said magnet rotates said instrument to a position in line with said station and holds it in said position whereat said calibrations can be read by an observer at said viewing station.

3. In a testing instrument adapted for immersion in successive samples of liquids to be tested and free rotation in said liquids upon a vertical axis and to be read from a preselected viewing station; said instrument having a visible scale rigidly mounted thereupon: a bar magnet bodily movable with and in relation to said instrument and mounting instrumentalities connecting said magnet and said instrument through which said instrument is prepared for use by bodily angular movement of said magnet in relation to the body of said instrument to a position such that when said instrument is freely movable as aforesaid under the influence of a magnetic pole of the earth said magnet through said instrumentalities moves said instrument so that said scale is disposed at a position opposite said preselected viewing station at which it may be readily read by an observer at said station, said instrumentalities connecting said magnet and the body of said instrument with sufficient force to overcome the inertia of the instrument when so disposed but with insufficient force to prevent such preparatory movement.

4. In a testing instrument adapted for immersion and free rotation upon a vertical axis in a succession of liquids; said instrument having a scale disposed thereupon and bodily movable therewith and said scale embodying visible calibrations: that improvement which consists of a magnet, and presettable connections between the body of said instrument and said magnet by which said instrument is prepared for its intended use by bodily angular movement of said magnet to a position such that when said instrument is freely rotatable as aforesaid said instrument under the influence of a magnetic pole of the earth rotates said magnet to a position such that said calibrations are opposite a preselected viewing station whereat they can be directly read by an observer at said station, said connections after being pre-set having sufficient force to overcome the inertia of the instrument and to rotate it as aforesaid.

5. In a testing instrument adapted for immersion in successive samples of liquids to be tested and free rotation therein upon a vertical axis, a scale upon said instrument bodily movable therewith, visible calibrations upon said scale, said instrument having rounded vertical surfaces, and a pre-settable magnetic orienting formation disposed predominantly in a horizontal plane and with rounded edges operatively engaging said surfaces of said instrument to permit angular adjustment of said magnetic orienting device about the vertical axis of the instrument, said formation being responsive to force of a magnetic pole of the earth to cause said formation bodily to rotate said instrument upon said vertical axis when it is immersed in the liquid, magnetic force being applicable to said formation in order to move it relatively to said instrument while said instrument is held motionless thereby pre-setting said formation, the position of said formation relative to said instrument after having been so set and when free to rotate upon said axis in said liquids being such as to dispose said scale opposite a preselected viewing station whereby said calibrations can easily be read.

6. In a testing instrument adapted for immersion in successive samples of liquids to be tested and free rotation therein upon a vertical axis, a scale upon said instrument and movable with said instrument, visible calibrations upon said scale, a chamber in said instrument, and a flat magnetic element mounted upon said instrument in a horizontal plane and operatively engaging surfaces of said chamber, said element and an interior surface of said chamber having frictionally engageable surfaces wherethrough movement of said element moves said instrument when said instrument is free to rotate in said liquid and said surfaces slipping when said instrument is held against such rotation whereby said magnetic element under the influence of a magnetic pole of the earth rotates said instrument to dispose said scale in a position opposite a preselected viewing station, and alternatively can be pre-set to establish orientation between said element and said viewing station.

7. In a testing instrument adapted for immersion in successive samples of liquids to be tested and to be directly read at a preselected relatively adjacent viewing station, means for maintaining said instrument vertical in said liquids, a visible scale rigid with said instrument, a magnetic orienting device, and a mount for said device frictionally engaging and effective upon said instrument while it is immersed in said liquid for rotating it to a position opposite said preselected station and holding it in such position so that said scale may be read by an observer at said station, the value of the magnetic force of said device being greater than that of the inertia of said instrument when free to rotate and less than that of such frictional engagement whereby said device is rotated under the influence of a magnetic pole of the earth when so immersed, the value of the magnetic force of said device and that of such frictional engagement being insufficient to prevent rotation of said device relatively to said instrument when said instrument is held against rotation thereby re-setting said instrument at will so that said scale is disposed opposite another station selected in a different location.

8. In a testing instrument adapted for immersion in successive samples of liquids to be tested and free rotation upon a vertical axis in such liquids and to be read from a pre-selected fixed viewing station, means for maintaining said instrument upon said vertical axis in the liquid, a visible scale rigidly attached to said instrument for bodily movement therewith, magnetic means for orienting said instrument, a mount for said orienting means effective upon said instrument while it is immersed in said liquid for bodily rotating said instrument to a position at which said scale is opposite said pre-selected viewing station, a connection between said mount and said instrument having capacity to transmit motion to said instrument when it is immersed in said liquid, said capacity being insufficient to transmit such motion when said instrument is fixed against rotation whereby it is disabled so that said orienting means may be re-set to bring said scale opposite another and differently disposed preselected viewing station, and means effective upon said mount for restricting such re-setting movement to rotation in a horizontal plane on an axis coincident with the vertical axis of said instrument as a whole.

9. In a testing instrument adapted for immersion in successive samples of a liquid and free rotation therein upon a vertical axis, an enclosing tube, said tube including a scale chamber and an orientation chamber, a scale in said chamber and revoluble therewith, means for maintaining said instrument on a vertical axis while it is immersed in the liquid, and a magnet device mounted in said orientation chamber, an interior wall of an inner surface of said orientation chamber bearing against said magnet device with sufficient pressure so that the rotation of said magnet bar to the north rotates said immersion instrument upon said vertical axis so that said scale can be conveniently read from a pre-selected viewing station and said pressure being insufficient to prevent an initial setting of said magnet upon application of an external magnetic force greater than that of said pressure.

10. In an immersion testing instrument adapted for immersion in successive samples of liquids to be tested and having a scale, means for maintaining said instrument upon a vertical axis when immersed in said liquid, an orienting chamber, an orienting magnet mounted upon said instrument within said chamber, and a resilient connective device between said magnet and an inner wall of said chamber through which said magnet rotates said instrument so that its scale assumes a position opposite a pre-selected viewing station, said resilient connection permitting relative movement between said magnet and said instrument so that said magnet can be re-set.

11. In a testing instrument adapted for immersion in successive samples of liquids to be tested and free rotation therein upon a vertical axis, a tube, said tube including a scale chamber and an orientation chamber, a scale with calibrations rigidly mounted in said scale chamber, means for maintaining said instrument on said vertical axis, and a magnet device mounted in said orientation chamber, the contour and dimensions of an interior wall of said orientation chamber and the contour and dimensions of said magnet device being such that said magnet device bears against said wall with sufficient pressure so that the rotation of said magnet device to the north rotates said immersion instrument upon said vertical axis so that said scale is disposed at a position opposite a pre-selected viewing station whereby said scale can be conveniently read and said contact being insufficient to prevent relative movement between said magnetic device and said instrument selectively to re-set said magnetic device by the application from the exterior of said orientation chamber of sufficient magnetic attractive force.

12. In a testing instrument adapted for immersion in successive samples of liquids to be tested and free rotation therein upon a vertical axis, said instrument embodying a chamber which is circular in horizontal cross-section, a scale upon and bodily movable with said instrument, visible calibrations upon said scale, and a pre-settable magnetized element with a rounded outer peripheral surface frictionally engaging an inner surface of said chamber for transmitting movement to said instrument to rotate it to dispose said scale in a position opposite a pre-selected viewing station, such frictional engagement being overcome when said instrument is held rigid and force applied to said magnetized element greater than the resistance of said frictional engagement.

13. In a testing instrument adapted for immersion in successive samples of liquids and free rotation therein upon a vertical axis, a scale upon and movable with said instrument, an enclosure in said instrument, an element of magnetized plastic within said enclosure outer surfaces of which bear against the interior of the walls of said enclosure with a predetermined force, such bearing force being sufficient to transmit the movement of said magnetized plastic to said instrument to rotate said instrument upon said axis so that said scale is disposed opposite a pre-selected viewing station and insufficient to prevent re-setting of said element by the application of greater magnetic force from without said enclosure.

14. A testing instrument adapted for immersion in successive samples of liquids to be tested and free rotation therein upon a vertical axis, a scale upon and bodily movable with said instrument, visible calibrations upon said scale, a chamber in said instrument circular in horizontal cross-section, and a flat magnetic orienting element disposed within said chamber in a horizontal plane, said orienting element having rounded edges engaging an interior surface of said chamber with sufficient bearing force to transmit the motion of said element to said chamber and hence said instrument to rotate said instrument so that said scale is opposite a pre-selected viewing station and insufficient bearing force to prevent a more powerful magnetic force from re-setting said element so that it can cooperate with a different viewing station.

15. In a testing instrument adapted for immersion in successive samples of liquids to be tested and free rotation therein upon a vertical axis, a scale mounted upon and bodily movable with said instrument, visible calibrations upon said scale, and a magnetic orienting element, said orienting element having a resilient face engaging a fixed part of said instrument and magnetic properties which cause it to rotate said instrument to dispose said scale opposite a pre-selected viewing station, the resilience of said face being sufficient to cause slippage between said element and said instrument when a more powerful magnetic force is applied to said element to re-set said element so that said scale may be disposed opposite a differently-disposed viewing station.

16. In a testing instrument adapted for immersion in successive samples of liquids to be tested and free rotation therein upon a vertical axis and having a scale to be read visually, a bar magnet, and a mount for supporting said magnet within said instrument in any one of a plurality of different positions, said mount having a plurality of different formations with which said magnet may be selectively engaged for communicating the movement of said magnet to said instrument, whereby said magnet as it seeks north rotates said instrument to bring said scale to that one of said positions whereat said scale is disposed opposite a pre-selected viewing station, said formations being so constructed that said magnet may be freed from said mount whereby said bar magnet may be adjusted to engage other formations so disposed that when said bar magnet is engaged thereby said instrument is rotated to bring said scale to a position opposite another pre-selected viewing station.

17. In an immersion instrument having an outer enclosure, a scale with visible calibrations and a central vertical tube containing a fluid which cooperates with said scale to indicate a characteristic of the liquid being tested; a magnet bar with a central opening, said tube passing through said opening whereby said magnet bar is pivotally mounted upon said tube within said enclosure, and a connection between said bar and said instrument whereby the rotation of said bar as it seeks north moves said scale to a position opposite a pre-selected viewing station whereby the position of said fluid in relation to said scale may be readily read, said magnet bar being bodily movable upon said tube so that upon inversion of said instrument said connection is rendered ineffective and being pivotally movable upon said tube after said connection has been rendered ineffective so that it may be rotated thereon to change the position of the polar axis of said magnet bar relative to said scale.

18. In an instrument for testing successive samples of liquids by immersion therein, said instrument having an outer enclosure, a scale rigidly positioned within said enclosure, and a central vertical tube containing a fluid which cooperates with said scale to indicate a characteristic of the liquid being tested; a magnet bar with a central opening, said tube passing through said opening whereby said magnet bar is pivotally mounted upon said tube, and an operating connection between said bar and said enclosure whereby the rotation of said bar as it seeks north moves said tube to a predetermined position, said connection being stronger than the force of the earth's magnetic polar attraction exerted upon said magnet and being sufficiently yielding so that upon the application to said bar of a greater force it is rotated to another position whereby the position which is assumed by said scale in said liquid when the instrument is immersed therein may be adjusted at will.

19. In a self-orienting instrument for testing successive samples of liquids by immersion therein, said instrument having an outer enclosing tube, a rigid and vertical scale positioned within said tube, said tube at a point below the lower end of said scale being contracted to form a shoulder, a central vertical tube containing a fluid which cooperates with said scale to indicate a characteristic of the liquid being tested, said tube passing below said shoulder, a magnet bar with a central opening, said magnet bar being mounted above said shoulder and being loosely supported thereby when said instrument is in normal operating position and said tube passing through said opening whereby said magnet bar is pivotally mounted upon said tube, resilient facings between the ends of said bar and the adjacent inner surfaces of said enclosure, said enclosure about said bar and between it and said lower end of said scale being straight sided, said facings forming an operative connection between said bar and the inner wall of said enclosure whereby the rotation of said bar as it seeks north moves said tube to a predetermined position, said bar when said instrument is inverted falling away from said shoulders and when said instrument is placed in a substantially horizontal position being pivotally movable upon said tube to a new position, said bar falling into a new angular relation to a plane perpendicular to said tube when said instrument is placed in its original position, whereby the orientation of said instrument can be changed.

20. In a testing instrument adapted for immersion in successive samples of liquids to be tested and free rotation therein on a vertical axis, a vertical scale upon said instrument, visible calibrations upon said scale, an orienting bar magnet, and a horizontal mount for said magnet operatively attached to said instrument and rotatable therewith, said mount embodying detents by which said magnet can be locked in a plurality of different positions.

21. In a testing instrument adapted for immersion in successive samples of liquids to be tested and free rotation therein upon a vertical axis, a vertical scale upon said instrument, visible calibrations upon said scale, means for maintaining said instrument vertical in the liquid, an orienting magnet, a horizontal mount for said magnet operatively attached to and rotatable with said instrument, a vertical pivot upon said mount upon which said bar magnet is rotatable in relation to said mount, and detent means for holding said bar magnet in the position into which it has been rotated.

22. In a testing instrument adapted for immersion in successive samples of liquids to be tested and free rotation therein upon a vertical axis, a vertical scale upon said instrument, visible calibrations upon said scale, means for maintaining said instrument vertical in the liquid, an orienting bar magnet, and a horizontal mount for said magnet operatively attached to and rotatable with said instrument, said mount including detents for holding said bar magnet in a plurality of different positions and a vertical pivot upon which said bar magnet is bodily movable upon inversion of said instrument to free said bar magnet from one of said detents and upon which pivot it is thereafter rotatable to change its angular relation to said scale and thereafter bodily movable upon re-inversion of said instrument into operative contact with another of said detents.

23. In a testing instrument adapted for immersion in successive samples of a liquid and free rotation therein upon a vertical axis, a vertical scale upon said instrument movable therewith, visible calibrations upon said scale, a chamber circular in horizontal cross-section being embodied within said instrument, and an orienting disc disposed within said chamber in a substantially horizontal plane, a peripheral edge of said disc being arcuate frictionally to engage an inner generally vertical surface of said chamber and said disc having magnetic properties which cause it to rotate said instrument to dispose said scale in a pre-determined position opposite a pre-selected viewing station.

24. In a testing instrument adapted for immersion in successive samples of liquids to be tested and free rotation therein upon a vertical axis, a scale mounted upon and bodily movable with said instrument, visible calibrations upon said scale, an orientation chamber in said instrument, a cruciform orienting device disposed within said chamber, said device being magnetized to cause it to seek north and the projecting ends of said cruciform element frictionally engaging the inner surface of a generally vertical wall of said chamber whereby movement of said device is communicated through said chamber to said instrument and being pre-set to dispose said scale opposite a pre-selected viewing station.

25. In a testing instrument adapted for immersion in successive samples of liquids to be tested and free rotation therein upon a vertical axis, a scale mounted upon and bodily movable with said instrument, visible calibrations upon said scale, an orientation chamber in said instrument, a flat multi-armed orienting device of magnetized plastic disposed within said chamber, the projecting ends of said arms frictionally engaging the inner surface of a generally vertical wall of said chamber whereby movement of said device is communicated through said chamber to said instrument and being preset to dispose said scale opposite a pre-selected viewing station.

26. In a testing instrument adapted for immersion in successive samples of liquids to be tested and free rotation therein upon a vertical axis and to be directly read from a pre-selected adjacent viewing station, a vertical scale mounted upon and movable with said instrument, visible calibrations upon said scale, an orientation chamber embodied within said instrument, and an orienting disc disposed within said chamber, the periphery of said disc operatively and frictionally and movably engaging the inner surface of a predominantly vertical wall of said chamber with sufficient force to move said instrument therewith when said disc is freely rotatable and insufficient force to prevent preliminary setting when said instrument is held against rotation and relatively great magnetic force applied thereto, the diameter of said disc being slightly less than that of said chamber, said disc carrying a bar magnet which causes it to rotate said instrument upon said axis, the orientation of said disc to said instrument being such that upon the rotation of said instrument said scale is disposed opposite said viewing station.

27. In an instrument of a syringe type adapted for testing characteristics of successive samples of liquids, said instrument having a relatively large outer tube, a bulb for drawing the liquid to be tested into said tube, a tubular testing device within said tube, said tubular device having a scale mounted thereon for bodily movement therewith, means for maintaining said device within the liquid drawn into said outer tube in suspension upon a vertical axis; the improvement comprising, in combination, magnetic orienting means within said inner device, and a connection between said magnetic orienting means and said inner tube, said connection being movable for adjustment in relation to said tube and movable after such adjustment with said tube, cooperating surfaces of said tube and connection being characterized by frictional contact sufficient to transmit force from said magnetic means to said tube under the influence of a magnetic pole of the earth when said instrument is free to rotate and insufficient to prevent rotation of said device for pre-setting when a greater magnetic force is applied to move said magnetic means to its orienting position when said instrument is held rigid for presetting, whereby said inner device is rotated within the fluid in said outer tube and said scale assumes a position opposite a selected viewing station irrespective of the position in which said outer tube is held or the tendency of said inner tube to rotate therewithin if free so to do.

(References on following page)

References Cited in the file of this patent

UNITED STATES PATENTS

| | | |
|---|---|---|
| 1,491,487 | Means | Apr. 22, 1924 |
| 1,595,801 | McDonald | Aug. 10, 1926 |
| 2,192,148 | Otto | Feb. 27, 1940 |
| 2,260,396 | Otto | Oct. 28, 1941 |
| 2,520,911 | Chaney | Sept. 5, 1950 |
| 2,554,374 | Melas | May 22, 1951 |

FOREIGN PATENTS

| | | |
|---|---|---|
| 40,991 | Germany | Oct. 8, 1887 |
| 539,384 | Great Britain | Sept. 9, 1941 |